United States Patent [19]

Fletcher et al.

[11] 4,247,625

[45] Jan. 27, 1981

[54] IMAGING PROCESSES, ELEMENTS AND COMPOSITIONS FEATURING DYE-RETAINING BINDERS FOR REACTION PRODUCTS OF COBALT COMPLEXES AND AROMATIC DIALDEHYDE

[75] Inventors: George L. Fletcher; Wojciech M. Przezdziecki, both of Pittsford; John C. Wilson, Rochester; Paul D. Yacobucci, Rochester; Richard C. Van Hanehem, Rochester, all of N.Y.

[73] Assignee: Eastman Kodak Company, Rochester, N.Y.

[21] Appl. No.: 971,464

[22] Filed: Dec. 20, 1978

[51] Int. Cl.$^3$ ......................... G03C 1/72; G03C 3/06; C03C 7/26

[52] U.S. Cl. .................................... 430/336; 430/341; 430/332; 430/495; 430/536; 430/541; 430/936

[58] Field of Search ......... 96/88, 90 R, 48 R, 48 HD, 96/49, 91 R, 91 N; 430/332, 340, 341, 495, 936, 336, 541

[56] References Cited

U.S. PATENT DOCUMENTS

| | | | |
|---|---|---|---|
| 2,310,943 | 2/1943 | Dorough . | |
| 3,012,886 | 12/1961 | Lerner | 96/33 |
| 3,102,811 | 9/1963 | Barney | 96/48 |
| 3,161,511 | 12/1964 | Parker et al. | 96/49 |
| 3,260,599 | 7/1966 | Lokker | 96/75 |
| 3,383,213 | 5/1968 | Notley | 96/49 |
| 3,408,192 | 10/1968 | Aebi | 96/49 |
| 3,502,476 | 3/1970 | Itano et al. | 96/90 R |
| 3,515,547 | 6/1970 | Allentoff et al. | 96/49 |
| 3,615,475 | 10/1971 | Skarvinko | 96/75 |
| 3,677,760 | 7/1972 | Iwano et al. | 96/50 PT |
| 4,032,344 | 6/1977 | Fletcher et al. | 96/48 HD |
| 4,075,019 | 2/1978 | DoMinh | 96/48 HD |
| 4,107,155 | 8/1978 | Fletcher et al. | 528/373 |

FOREIGN PATENT DOCUMENTS 1052978 12/1966 United Kingdom .

OTHER PUBLICATIONS

Research Disclosure, vol. 126, No. 12617, p. 12–30, 10/1974.

Research Disclosure, vol. 158, No. 15874, p. 74–76, 6/1977.

*Primary Examiner*—Charles L. Bowers, Jr.
*Attorney, Agent, or Firm*—Dana M. Schmidt

[57] ABSTRACT

An imaging composition and element are disclosed wherein an aromatic dialdehyde reacts with amines generated in response to activating radiation. Improved binders are used to insure sufficient retention of the volatile dialdehyde prior to imaging.

16 Claims, No Drawings

IMAGING PROCESSES, ELEMENTS AND COMPOSITIONS FEATURING DYE-RETAINING BINDERS FOR REACTION PRODUCTS OF COBALT COMPLEXES AND AROMATIC DIALDEHYDE

INTRODUCTION (1) Field of the Invention

This invention relates to a composition and an element such as can be used for non-silver imaging, which rely upon the presence of aromatic dialdehyde dye precursors for the desired reaction. A binder is included that provides improved maximum densities for the imaging chemistry involving the dialdehyde.

(2) Background of the Invention

An imaging element and composition is described in *Research Disclosure,* Vol. 126, October 1974, Publication No. 12617, paragraph III H (29), and Vol. 158, June 1977, Publication No. 15874, published by Industrial Opportunities Limited, Homewell, Havant Hampshire PO91EF, United Kingdom. As disclosed, phthalaldehyde is used as an imaging composition which responds to ammonia released by a cobalt(III) complex that is reduced by a photoactivated photoreductant. Although such an element and composition are highly useful, the binders therein disclosed, such as cellulose acetate butyrate, are not superior retentive agents for phthalaldehyde because significant amounts can be lost during element preparation and processing. For example, reasonable amounts of cellulose acetate butyrate result in maximum shoulder densities of only between about 0.1 and about 0.5 under typical exposure conditions. Although such densities do represent a discernable image, higher densities, e.g., at least as high as 1.0, are desirable for most commercial applications.

Other binders have been provided for phthalaldehyde imaging. For example, poly(N-vinylpyrrolidone), hereinafter PVP, is disclosed as a useful binder for phthalaldehyde in an imaging chemistry described in U.S. Pat. No. 3,102,811. However, although PVP appears to have improved retention of phthalaldehyde, it has been found that, for reasons that are not understood, no image is achieved using PVP as the binder for phthalaldehyde in the imaging chemistry described in the aforesaid *Research Disclosures.*

(3) Related Patents

U.S. Pat. No. 4,107,155, issued Aug. 15, 1978, entitled "Polysulfonamides", discloses and claims certain polymers herein described as preferred binders in an element or composition comprising an aromatic dialdehyde dye precursor.

SUMMARY OF THE INVENTION

In accord with the present invention, there is advantageously featured a composition and element containing an imaging system comprising an aromatic dialdehyde capable of reacting with amines to form a dye, a material capable of generating amines in response to activating radiation, and a binder that provides improved maximum densities for such an imaging system. More specifically there is provided an improved composition, suitable for coating, based upon the discovery that a number of polymeric binders provide such improved maximum densities for volatile dye precursors, e.g., phthalaldehyde, compared to prior art binders.

The binders featured in these improved compositions comprise a polymer having recurring units selected from the group consisting of structures (I) through (III) noted hereinafter. Such compositions provide for an improved imaging method.

DESCRIPTION OF THE PREFERRED EMBODIMENTS

Although this invention is hereinafter described in connection with phthalaldehyde as the preferred volatile dye precursor, the invention is not limited thereto. Rather, it can be used to advantage with any volatile dye precursor capable of reacting with amines to form a dye, e.g., other aromatic dialdehydes that are amine-responsive dye precursors, for example, 4-hydroxy-, 4-methacryloyloxy-, 4-t-butyl-, and 4-bromo-1,2-benzenedicarboxaldehyde; 5,6,7,8-tetrahydro-5,5,8,8-tetramethylnaphthylene-2,3-dicarboxaldehyde; and 2,3-naphthalenedicarboxaldehyde.

o-phthalaldehyde is a convenient dye precursor capable of selective reaction with amines such as ammonia and primary amines to form a black dye. The dye reaction sequence, in the case of $NH_3$, is believed to be as follows:

(1)

(2)

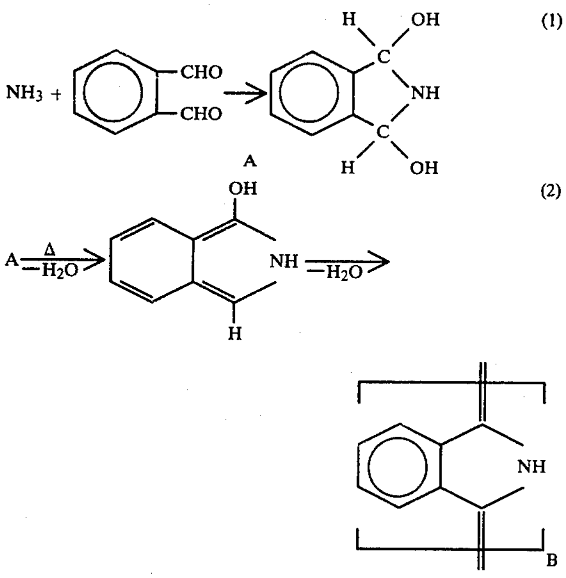

B

A convenient form of the composition of the invention features phthalaldehyde contained in a coated and dried binder that forms an element adapted to respond to the presence of amines, imagewise generated, to form the oligomer dye B noted above. In accordance with one aspect of the invention, it has been discovered that through the selection of certain polymeric materials as the binder, improved $D_{max}$ values can be obtained for dye B. As used herein, $D_{max}$ refers to the maximum densities available from an imaging composition or element upon full exposure to activating radiation. Such $D_{max}$ values are equivalent for example to the so-called shoulder densities depicted on a conventional density-log exposure curve plotted for the composition or element in question.

To provide a source of amines for reaction (1), the composition or element of the invention further includes a material capable of generating amines in response to activating radiation, as discussed in detail hereinafter.

In accordance with one aspect of the invention, the binder is selected from polymers, either homopolymers or copolymers, having recurring units with a structure selected from the following formulas (I) through (III):

(I) 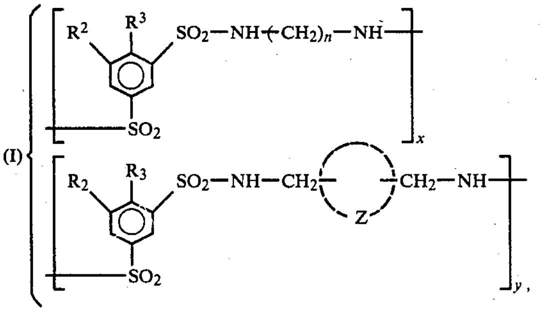

(II) 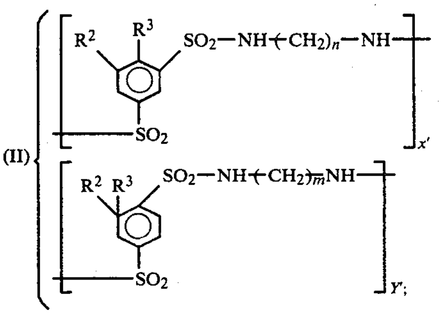

and (III) 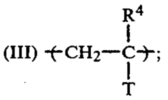

wherein $R^2$ and $R^3$ are the same or different, and are each hydrogen, halogen such as chlorine, bromine and the like; or alkyl from 1 to 4 carbon atoms, for example methyl, ethyl, and the like;

T is either cyano or

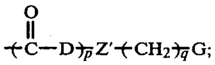

D is —O— or —NH—;

Z' is a covalent bond between carbon and D, or is the moiety

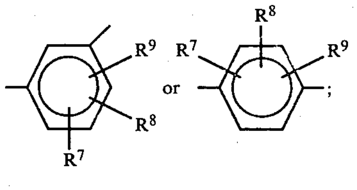

G is either $—NR^1—SO_2R^5$ or $—SO_2—NR^1R^6$;

$R^1$ is hydrogen or methyl;

$R^4$ is hydrogen or alkyl containing from 1 to 4 carbon atoms, such as methyl, ethyl, propyl, isopropyl and the like;

$R^5$ and $R^6$ are each alkyl containing from 1 to 4 carbon atoms, such as methyl, ethyl, propyl, isopropyl and the like; aralkyl such as benzyl and the like, or aryl or substituted aryl containing from 6 to 10 carbon ring atoms, such as phenyl, naphthyl, methylphenyl, ethylphenyl, trimethylphenyl, methylnaphthyl, and the like;

$R^7$, $R^8$ and $R^9$ are the same or different and are each hydrogen; alkyl containing from 1 to 3 carbon atoms, for example, methyl, ethyl, propyl, isopropyl, and the like; or G as defined above;

n and m are different and are each an integer of from 2 through 12; p is 0 or 1; q is 0, 1, 2 or 3 except that it is 0 or 1 if Z' is phenylene;

x, x', y and y' are mole percentage amounts of the respective recurring units, x ranging from 0 to about 90%, y being at least about 10%, and x' and y' being from 0 to 100%;

and Z represents the atoms necessary to form a saturated or unsaturated carbocyclic ring having from 5 to 7 carbon ring atoms, for example, cyclohexamethylene, cycloheptamethylene, phenylene and the like.

Useful specific polymers within these classes are polyacrylonitriles such as poly(methacrylonitrile), and polysulfonamides such as poly[N-(4-methacryloyloxyphenyl)-methanesulfonamide]; poly(ethylene-co-1,4-cyclohexylenedimethylene-1-methyl-2,4-benzenedisulfonamide); poly(ethylene-co-1,4-cyclohexylenedimethylene-1-chloro-2,4-benzenedisulfonamide); poly(ethylene-co-1,4-cyclohexylenedimethylene-1,2-dichloro-3,5-benzenedisulfonamide); poly(ethylene-co-1,4-cyclohexylenedimethylene-1-chloro-3,5-benzenedisulfonamide); poly(ethylene-co-1,3-xylylene-1-methyl-2,4-benzenedisulfonamide); poly(1,4-cyclohexylenedimethylene-1-methyl-2,4-benzenedisulfonamide); poly(1,3-xylylene-1-methyl-2,4-benzenedisulfonamide); and poly(ethylene-co-hexamethylene-1-methyl-2,4-benzenedisulfonamide. Of these, poly(ethylene-co-1,4-cyclohexylenedimethylene-1-methyl-2,4-benzenedisulfonamide) is highly preferred.

Non-interfering repeating units other than those mentioned can be included in the copolymers useful in the invention.

Preparation of the poly(acrylonitriles) proceeds via conventional processes. The above-mentioned polysulfonamides can be prepared either as condensation polymers, wherein an $—NHSO_2—$ group is in the backbone of the polymer, or as addition polymers wherein an $—NR^1SO_2—$ group is a pendant moiety. The former is made by a direct solution polycondensation reaction preferably using aromatic disulfonyl chlorides and diamines in the presence of an acid scavenger. The latter is preferably a polymerization of vinyl monomers containing a sulfonamide pendant moiety.

The condensation reaction can be done in at least two different ways. The first, hereinafter identified as Method A, involves the following procedure. A flask equipped with power stirrer, reflux condenser, and dropping funnel is charged with diamine, $Ca(OH)_2$ and tetrahydrofuran (THF). The mixture is heated to boiling on the steam bath after which the steam bath is removed and a solution of the disulfonyl chloride in THF is added to the vigorously stirred mixture as rapidly as the condenser accommodates the exothermal reaction (2–3 min). The thick suspension is stirred and heated on steam for an additional hour, then cooled to room temperature. Acetone is added and after stirring for 30 min. the suspension is suction filtered through appropriate filter paper. The clear solution is precipitated into ten times its volume of water with vigorous stirring, then soaked in fresh water overnight. The fibrous polymer is air dried for 24 hours, then vacuum dried at 45° C. to constant weight.

A second method, hereinafter labeled Method B, features a flask equipped with power stirrer, dropping funnel, and thermometer, charged with diamine $Ca(OH)_2$ and THF. A solution of the disulfonyl chloride in THF is added dropwise to the stirred suspension during one hour while maintaining the temperature of the reaction mixture at 20°-30° C. with the aid of an ice bath. The reaction is continued for an additional 24 hours whereupon the viscous mixture is diluted with THF. The suspension is suction filtered through filter paper and acetic anhydride is added to the filtrate and the solution stirred at room temperature for 24 hours. The polymer solution is precipitated in water and further treated as in Method A.

Further details concerning the preparation and properties of these polymers, and particularly of vinyl addition polymers, can be found in *Research Disclosure*, Vol. 131, March 1975, Publication No. 13107, particularly paragraphs M through R, the details of which are expressly incorporated herein by reference.

It is not completely understood why these polymeric binders provide improved $D_{max}$ values. Although understanding is not essential to the practice of the invention, it is believed that, in part, the binders of this invention are superior materials for the retention of phthalaldehyde, a volatile molecule. However, there is not an exact correspondence between best retention of phthalaldehyde and best $D_{max}$ values.

The molecular weight of the polymer selected for the binder does not appear to be critical to the formation of improved $D_{max}$ values. Furthermore, the molecular weights are subject to wide variation even within a given class of polymers, depending on the preparation conditions, as is well known. For example, useful polysulfonamides of the type described above can have molecular weights within and beyond the range evidenced by inherent viscosities from about 0.3 to about 1.5, measured as a 0.25 weight percent solution in dimethylformamide. A preferred range of inherent viscosities is from about 0.6 to about 0.9.

To supply the amines for reaction with phthalaldehyde, any material capable of generating amines can be used. Cobalt(III) complexes containing releasable ammonia ligands are particularly useful in such amine-generating material. One advantage derived from such cobalt(III) complexes is that they are reducible by the adduct formed when phthalaldehyde reacts with amines en route to the formation of the dye B described above. Such reduction, in the case of hexa-ammine cobalt(III) complex, is believed to occur as per the following:

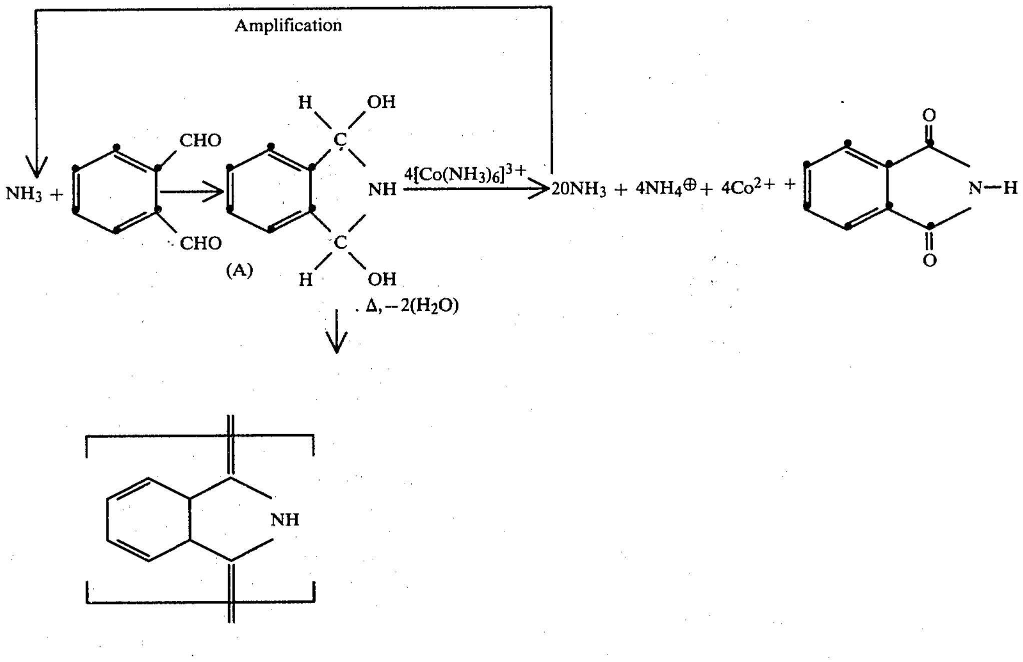

B

Thus, once the cobalt(III) complex is reduced and releases the amine ligands as described hereafter, the noted adduct forms and causes further reduction and generating of amines, producing an amplification reaction.

Such cobalt(III) complexes can be either thermally stable or thermally unstable, as measured at usual processing temperatures, and, if unstable, require no additional compound to cause the initial release of the amine ligands. On the other hand, complexes that are thermally stable at such processing temperatures can be used in combination with destablizer compounds, as explained hereinafter.

Any cobalt(III) complex containing releasable amine ligands and which is thermally stable at room temperature will function in this invention, whether or not it is thermally stable within the processing temperatures used. Such complexes on occasion have been described as being "inert". See, e.g., U.S. Pat. No. 3,862,842, columns 5 and 6. However, the ability of such complexes to remain stable, i.e., retain their original ligands when stored by themselves or in a neutral solution at room temperature until a chemically or thermally initiated reduction to cobalt(II) takes place, is so well known that the term "inert" will not be applied herein.

Useful cobalt(III) complexes feature a molecule having a cobalt atom or ion surrounded by a group of atoms, ions, or other molecules which are generically referred to as ligands. The cobalt atom or ion in the center of these complexes is a Lewis acid while the ligands are Lewis bases. While it is known that cobalt is capable of forming complexes in both its divalent and trivalent forms, trivalent cobalt complexes—i.e., cobalt(III) complexes—are employed in the practice of this invention, because the ligands are relatively tenaciously held in these complexes and released when the cobalt is reduced to the (II) state.

Preferred cobalt(III) complexes useful in the practice of this invention are those having a coordination number of 6. A wide variety of amine ligands selected from ammonia and primary amines can be used with cobalt(III) to form a useful cobalt(III) complex. Useful amine ligands include, e.g., methylamine, ethylamine, ammines, and amino acids such as glycinato. As used herein, "ammine" refers to ammonia specifically when functioning as a ligand, whereas "amine" is used to indicate the broader class noted above. Thus, "amine" includes ammonia. Amine complexes other than ammines achieve best results when used with particular destabilizer materials hereinafter described, for example, photoreductants.

The cobalt(III) complexes can be neutral compounds which are entirely free of either anions or cations. As used herein, "anion" refers to non-ligand anions, unless otherwise stated. The cobalt(III) complexes can also include one or more cations and anions as determined by the charge neutralization rule.

A wide variety of anions can be used, and the choice depends largely on whether or not the complex is to be thermally stable when heated to the temperature at which the composition or element is processed. As used herein, "thermal instability" means that the complex decomposes at the temperature in question, hereinafter called "instability temperature". The result is the release of enough ligands to start the intended reaction of the amine-generating material as described herein. If the complex is intended to be thermally unstable, it is preferred that it be unstable at temperatures greater than about 100° C. If it is intended to be thermally stable, so as to be used with a destabilizer material, it is preferred that it be stable at temperatures at least as high as about 130° C. Those complexes that are unstable undergo a reduction to a cobalt(II) when heated to the instability temperature.

The anions which tend to render the complex thermally unstable include those that decompose readily to a radical, such as trichloroacetate; those forming unstable heavy metal salts, such as azido; and those which are themselves reducing agents, such as 2,5-dihydroxybenzoate, N,N-dimethyldithiocarbamate, and 1-phenyltetrazolyl-5-thiolate.

Representative examples of complexes containing ligands which are reported as being thermally unstable above 100° C. are listed below:

$[Co(III)(NH_3)_3(N_3)_3]$
$[Co(III)(NH_3)_5(C_2O_4)]^{1+}X_n$
$[Co(III)(NH_3)_4(C_2O_4)]^{1+}X_n$
$[Co(III)(NH_3)_2(C_2O_4)_2]^{1-}X_n$
$[Co(III)(NH_3)_3(H_2O)(C_2O_4)]^{1+}X_n$
$[Co(III)(NH_3)_4(NO_2)(N_2H_4)]^{2+}X_n$
$[Co(III)(NH_3)_3(H_2O)_3]^{3+}X_n$
$[Co(III)(NH_3)_3Cl_3]$ wherein X is a suitable anion and n is the number of anions necessary to satisfy the charge neutralization rule.

Except for the special condition of thermal instability noted above, any anion can be selected if an anion is necessary for charge neutralization, provided the anion is compatible. As used herein, anions are considered "compatible" if they do not spontaneously cause a reduction of the cobalt(III) complex at room temperature. As noted, a complex does not require anions if it is already neutral.

The following Table I is a partial list of useful cobalt(III) complexes within the scope of the invention. The suffix (U) designates those which are thermally unstable above about 100° C.

TABLE I

Cobalt(III) Complexes hexa-ammine cobalt(III) benzilate
hexa-ammine cobalt(III) thiocyanate
hexa-ammine cobalt(III) trifluoroacetate
hexa-ammine cobalt(III) hexafluorophosphate
hexa-ammine cobalt(III) trifluoromethane sulfonate
chloropenta-ammine cobalt(III) perchlorate
bromopenta-ammine cobalt(III) perchlorate
aquopenta-ammine cobalt(III) perchlorate
bis(methylamine) tetra-ammine cobalt(III) hexafluorophosphate
aquopenta(methylamine) cobalt(III) nitrate (U)
chloropenta(ethylamine) cobalt(III) perfluorobutyrate (U)
trinitrotris-ammine cobalt(III)
trinitrotris(methylamine) cobalt(III) (U)
μ-superoxodeca-ammine dicobalt(III) perchlorate (U)
penta-ammine carbonato cobalt(III) perchlorate
tris(glycinato) cobalt(III)

A highly preferred form of the material capable of generating amines is a composition comprising a thermally stable cobalt(III) complex containing releasable amine ligands and a destabilizer which serves to initiate release of amines from the complex in response to activating radiation. Such a destabilizer compound can be a compound responsive to heat, of which the following are examples: organo-metallics such as ferrocene, 1,1-dimethylferrocene, and tricarbonyls such as N,N-dimethylaniline chromium tricarbonyl; and organic materials such as 4-phenylcatechol, sulfonamido-phenols and naphthols, pyrazolidones, ureas such as thiourea, aminimides in polymeric or simple compound form, triazoles, barbituates and the like.

Alternatively, the destabilizers can be photoactivators which respond to exposure to light to form a reducing agent for the cobalt(III) complex, whereby cobalt(II) and free amines are formed. Such photoactivators can be spectral sensitizers such as are described in *Research Disclosure*, Vol. 130, Publication No. 13023, the details of which are expressly incorporated herein by reference.

Preferred photoactivators are photoreductants, such as metal carbonyls, e.g., benzene chromium tricarbonyl; β-ketosulfides, e.g., 2-(4-tolylthio)-chromanone; disulfides; diazoanthrones; diazophenanthrones; aromatic azides; carbazides; diazosulfonates; β-ketosulfides; diketones; carboxylic acid azides; organic benzilates; dipyridinium salts; diazonaphthones; phenazines; and particularly quinone photoreductants.

The quinones which are particularly useful as photoreductants include ortho- and para-benzoquinones and ortho- and para-naphthoquinones, phenanthrenequinones and anthraquinones. The quinones may be unsubstituted or incorporate any substituent or combination of substituents that do not interfere with the conversion of the quinone to the corresponding reducing agent. A variety of such substituents are known to the art and include, but are not limited to, primary, secondary and tertiary alkyl, alkenyl and alkynyl, aryl, alkoxy, aryloxy, alkoxyalkyl, acyloxyalkyl, aryloxyalkyl, aroyloxyalkyl, aryloxyalkoxy, alkylcarbonyl, carboxy, primary and secondary amino, aminoalkyl, amidoalkyl, anilino, piperidino, pyrrolidino, morpholino, nitro, halide and other similar substituents. Such aryl substituents are preferably phenyl substituents and such alkyl, alkenyl and alkynyl substituents, whether present as sole substituents or present in combination with other atoms, typically incorporate about 20 or fewer (preferably 6 or fewer) carbon atoms.

A highly preferred class of photoreductants are internal hydrogen source quinones; that is, quinones incorporating labile hydrogen atoms. These quinones are more easily photoreduced than quinones which do not incorporate labile hydrogen atoms.

Particularly preferred internal hydrogen source quinones are 5,8-dihydro-1,4-naphthoquinones having at least one hydrogen atom in each of the 5- and 8-ring positions, or those which have a hydrogen atom bonded to a carbon atom to which is also bonded the oxygen atom of an oxy substituent or a nitrogen atom of an amine substituent with the further provision that the carbon-to-hydrogen bond is the third or fourth bond removed from at least one quinone carbonyl double bond. As employed in the discussion of photoreductants herein, the term "amine substituent" is inclusive of amide and imine substituents.

Further details and a list of useful quinone photoreductants of the type described above are set forth in *Research Disclosure*, Volume 126, October 1974, Publication No. 12617, the contents of which are hereby expressly incorporated by reference. Still others which can be used include 2-isopropoxy-3-chloro-1,4-naphthoquinone and 2-isopropoxy-1,4-anthraquinone.

The quinone photoreductants rely upon a light exposure between about 300 nm and about 700 nm to form the reducing agent which reduces the cobalt(III) complex. It is to be noted that heating is not needed after the light exposure to cause the redox reaction to take place. However, an additional thermal exposure can be used as a development step to drive the reaction to a more timely completion. Furthermore, the heat is desirable to form the dye B. Hot-block heating is a convenient, known development technique.

An imaging element prepared in accordance with the invention preferably comprises the amine-generating material, phthalaldehyde and the binder all mixed together, in a single layer on the support. Alternatively, however, the material generating the amines in response to the radiation exposure can be confined to a separate layer associated with the phthalaldehyde layer. In this case, such a radiation-exposure layer can be simply applied, as by coating, over the phthalaldehyde-containing layer to form an integral element. Alternatively the radiation-sensitive layer can be formed separately from the phthalaldehyde layer, exposed and thereafter contacted with the phthalaldehyde-containing layer for development of the dye density.

As yet another alternative, an amplifier can be included. It can be either phthalaldehyde as described above, or it can be a compound which will chelate with cobalt(II) to form a reducing agent for remaining cobalt-(III) complexes. Such chelating compounds contain conjugated $\pi$-bonding systems. Typical amplifiers of this class, and necessary restrictions concerning pKa values of the anions that can be used in the cobalt(III) complex in such circumstances, are described in U.S. Pat. No. 4,075,019, issued Feb. 21, 1978 and in *Research Disclosure*, Vol. 135, July, 1975, Publication No. 13505, the details of which are expressly incorporated herein by reference.

In some instances, even thermally stable cobalt(III) complexes can be used without a destabilizer. Examples include compositions and elements containing the complex and a tridentate-chelate forming amplifier, exposed to a pattern of incident electron radiation as described in *Research Disclosure*, Vol. 146, Publication No. 14614, June, 1976. The details of that publication are expressly incorporated herein by reference.

In commonly owned U.S. Application Ser. No. 865,275, filed on Dec. 28, 1977, now abandoned, by A. Adin, entitled "Inhibition of Fogging Exposures Utilizing Cobalt(III) Complexes", there is disclosed the use of photolytically activated materials that inhibit the reduction of cobalt(III) complexes, whereby a positive-working element can be achieved. To the extent that such photoinhibitors are generally compatible with the binders of this invention, they can also be included in the compositions and/or elements herein described.

Manufacturing Techniques

To form an imaging element, the composition of the invention is preferably coated onto a support, particularly where the coating is not self-supporting. Any conventional photographic support can be used in the practice of this invention. Typical supports include transparent supports, such as film supports and glass supports, as well as opaque supports, such as metal and photographic paper supports. The support can be either rigid or flexible. The most common photographic supports for most applications are paper, including those with matte finishes, and transparent film supports, such as poly(ethylene terephthalate) film. Suitable exemplary supports are disclosed in *Product Licensing Index*, Volume 92, December 1971, Publication No. 9232, at page 108 and *Research Disclosure*, Volume 134, June 1975, Publication No. 13455. The support can incorporate one or more subbing layers for the purpose of altering its surface properties so as to enhance the adhesion of the radiation-sensitive coating to the support.

The composition of the invention is preferably coated out of a suitable solvent onto the support. Preferably the coating solvent is a non-aqueous solvent, such as acetone, a mixture of acetone and 2-methoxy ethanol, or dimethylformamide, to permit the use of other components such as photoactivators that are soluble in non-aqueous solvents. Therefore, the phthalaldehyde is usually present in non-hydrated form.

The proportions of the non-binder reactants forming the composition to be coated and/or the element can vary widely, depending upon which materials are being used. Where cobalt(III) complex is present, the molar amounts for such compositions can be expressed per mole of complex. Thus, if destabilizer materials are incorporated in addition to cobalt(III) complex, they can vary widely from about 0.004 mole per mole of complex, such as ferrocene, to about 5 moles per mole. For example, 5-n-butylbarbituric acid can be present in an amount of between about 0.005 mole and about 5 moles per mole of the complex. With respect to the phthalaldehyde, it can be present in an amount from about 1 to about 15 moles per mole of cobalt(III) complex.

A convenient range of coating coverage of phthalaldehyde is between about 2.5 and about 25 mg/dm$^2$. The binder of the invention conveniently can be coated in amounts between about 7.5 and about 150 mg/dm$^2$, highly preferred amounts being from about 60 to about 70 mg/dm$^2$.

Typically, the solution is coated onto the support by such means as whirler coating, brushing, doctor-blade coating, hopper coating and the like. Thereafter, the solvent is evaporated. Other exemplary coating procedures are set forth in the *Product Licensing Index*, Volume 92, December 1971, Publication No. 9232, at page 109. Addenda such as coating aids and plasticizers can be incorporated into the coating composition.

In certain instances, an overcoat for the radiation-sensitive layer of the element can supply improved handling characteristics, and can help to retain otherwise volatile components.

EXAMPLES

The following examples further illustrate the invention.

EXAMPLES 1-17

For these examples, stock solution A was prepared as follows:

| | |
|---|---|
| Acetone/2-methoxyethanol (80/20 w/w) | 73.8 g |
| Phthalaldehyde | 5.6 g |
| Hexa-ammine cobalt (III) trifluoroacetate, hereinafter CoHex TFA | 2.8 g |
| 2-isopropoxy-3-chloro-1,4-naphthoquinone | 0.8 g |
| Surfactant copolymer of dimethylpolysiloxane and polyoxyalkylene ether, available under the tradename Surfactant SF-1066 from General Electric | 0.84 g |

To 8.3 g of solution A were added 1.7 g of the polymers listed in Table II. Each coating mixture was then hand-coated at about 100-micron wet thickness on subbed poly(ethylene terephthalate) film support at about 27° C. After coating, the temperature of the coating block was increased to 60° C. and drying continued for 5 minutes. Samples were then allowed to equilibrate to ambient conditions for 24 hours before exposure to an 0.15 log E step tablet in an IBM Micro Copier, Model IID. Following exposure, the samples were thermally developed on a 130° C. hot block, support side contacting the hot surface, for 10 seconds.

TABLE II

| Example | Polymer |
|---|---|
| 1 | poly(methacrylonitrile) |
| 2 | poly(ethylene-co-1,4-cyclohexylenedimethylene-1-methyl-2,4-benzenedisulfonamide) (50:50)* |
| | 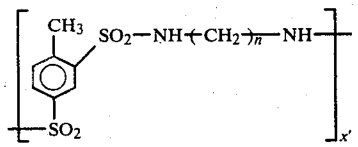 |

*Unless otherwise stated, percentage amounts of recurring units are listed as mole percents.

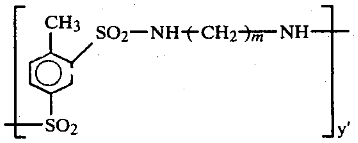

| Ex. | n | m | x' | y' |
|---|---|---|---|---|
| 3 | 6 | — | 100* | 0 |
| 4 | 6 | — | 100* | 0 |
| 5 | 8 | — | 100 | 0 |
| 6 | 2 | 6 | 20 | 80 |
| 7 | 2 | 6 | 40 | 60 |
| 8 | 2 | 6 | 50 | 50 |
| 9 | 2 | 6 | 60 | 40 |
| 10 | 2 | 6 | 80 | 20 |

*Taken from two different batch sources

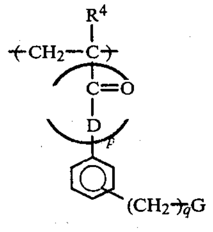

Position on Phenyl

TABLE II-continued

| Ex. | $R^4$ | D | P | q | G | Group |
|---|---|---|---|---|---|---|
| 11 | $CH_3$ | —O— | 1 | zero | $-NHSO_2CH_3$ | Para |
| 12 | $CH_3$ | —O— | 1 | 1 | $-NHSO_2CH_3$ | Para |
| 13 | $CH_3$ | —NH— | 1 | zero | $-NHSO_2CH_3$ | Para |
| 14 | $CH_3$ | —O— | 1 | zero | $-SO_2NHCH_3$ | Para |
| 15 | H | — | zero | zero | $-NHSO_2CH_3$ | Para |
| 16 | $CH_3$ | —NH— | 1 | zero | $-SO_2NH-(CH_2)_3-CH_3$ | Para |
| 17 | $CH_3$ | —O— | 1 | zero | $-NHSO_2CH_3$ | Meta |
| Control 1 | Cellulose acetate butyrate | | | | | |
| Control 2 | PVP, a 50:50 weight mixture of two polymers obtained under the tradename K90 & K30 from GAF. The ave. mole. wt. of K-90 is about 350,000, and of K-30 is about 40,000. | | | | | |
| Control 3 | Poly(N-p-tolylsulfonyl)methacrylamide | | | | | |

The sensitometric results are set forth in Table III. Each maximum neutral density was read twice and an average of the two readings was taken.

TABLE III

| | Sensitometric Results | | | |
|---|---|---|---|---|
| | Exposure - 2 seconds | | Exposure - 8 seconds | |
| Example | 0.15 log E steps | Max. Neutral Densities* | 0.15 log E steps | Max. Neutral Densities* |
| 1 | 6 | 3.06 | — | — |
| 2 | 10 | 3.19 | — | — |
| 2a | 10 | 3.07 | — | — |
| 3 | 7 | 2.38 | — | — |
| 4 | 9 | 2.71 | — | — |
| 5 | 5 | 1.30 | — | — |
| 5a | — | — | 9 | 1.38 |
| 6 | 8 | 2.60 | — | — |
| 7 | 9 | 2.86 | — | — |
| 8 | 10 | 3.19 | — | — |
| 9 | 11 | 3.25 | — | — |
| 10 | 11 | 3.56 | — | — |
| 11 | 9 | 2.93 | — | — |
| 12 | 5-6 | 1.08 | — | — |
| 12a | — | — | 10 | 1.08 |
| 13 | (Not soluble) | | — | — |
| 14 | 4 | 2.20 | — | — |
| 14a | — | — | 8 | 2.46 |
| 15 | 9 | 3.47 (high $D_{min}$) | — | — |
| 16 | 4-5 | 0.82 | — | — |
| 16a | — | — | 9-10 | 1.0 |
| 17 | 9 | 3.54 | — | — |
| Control 1 | 1 | 0.11 | — | — |
| Control 2** | 0 | 0 | 0 | 0 |
| Control 3 | 0 | 0 | — | — |

*The error is approximately ± 3%
**Even processing control 2 at 150° C. failed to develop an image.

Technically speaking, "maximum neutral densities" as indicated in Table III are not necessarily equivalent to $D_{max}$, the maximum shoulder densities. Instead, they are the maximum densities obtained in the maximum exposed areas, under the specified exposure and development conditions. However, it is well known that if more than three 0.15 log E steps are developed, one can assume with a high degree of confidence that the maximum neutral densities herein reported are in fact comparable to $D_{max}$ shoulder densities as previously defined. In fact, this is established by the repeat of Examples 5 (e.g., 5*a*), 12 (e.g., 12*a*), 14 (e.g., 14*a*), 16 (e.g., 16*a*) and control 2 wherein greater exposure levels did not appreciably increase the measured maximum neutral density.

Although neither the maximum neutral density nor $D_{max}$ for Example 13 could be determined because the binder was insoluble in the solvent used for these examples, the composition of Example 13 does produce an image of improved $D_{max}$ value when coated from some other solvent such as dimethylformamide.

Example 2*a* was a repeat of Example 2 to demonstrate the range of error.

EXAMPLES 18-37

Examples 1-17 were repeated except the formulation was as follows:

| | |
|---|---|
| Phthaladehyde | 320 mg |
| Cohex TFA | 200 mg |
| 2-Isopropoxy-1,4-naphthoquinone | 10.8 mg |
| Polymeric binder from Table IV | 1.90 g |
| Acetone | 7.6 g |

TABLE IV

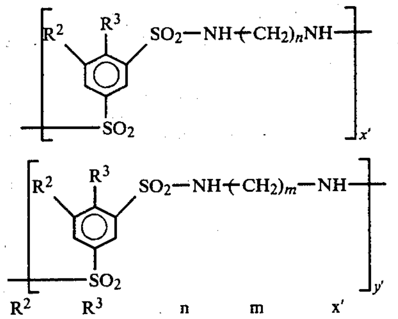

| Ex. | $R^2$ | $R^3$ | n | m | x' | y' |
|---|---|---|---|---|---|---|
| 18 | H | $CH_3$ | 3 | — | 100 | 0 |
| 19 | H | $CH_3$ | 4 | — | 100 | 0 |
| 20 | H | $CH_3$ | 5 | — | 100 | 0 |
| 21 | H | $CH_3$ | 7 | — | 100 | 0 |
| 22 | H | $CH_3$ | 8 | — | 100 | 0 |
| 23 | H | $CH_3$ | 10 | — | 100* | 0 |
| 24 | H | $CH_3$ | 2 | 4 | 50 | 50 |
| 25 | H | $CH_3$ | 2 | 8 | 50 | 50 |
| 26 | H | $CH_3$ | 2 | 12 | 50 | 50 |
| 27 | H | $CH_3$ | 5 | 6 | 50 | 50 |
| 28 | H | $CH_3$ | 6 | 7 | 50 | 50 |
| 29 | H | $CH_3$ | 6 | 8 | 50 | 50 |
| 30 | H | Cl | 6 | — | 100 | 0 |
| 31 | Cl | Cl | 6 | — | 100 | 0 |

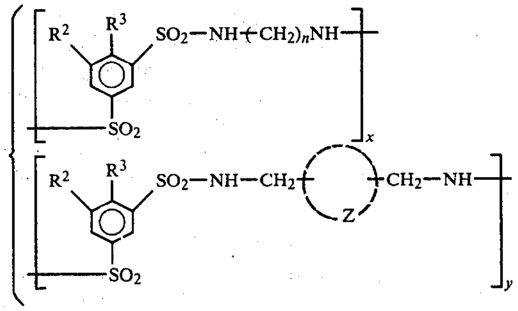

TABLE IV-continued

| Ex. | $R^2$ | $R^3$ | n | Z | x | y |
|---|---|---|---|---|---|---|
| 32 | H | $CH_3$ | — | phenylene | 0 | 100 |
| 33 | H | $CH_3$ | 2 | phenylene | 50 | 50 |
| 34 | H | Cl | — | cyclohexylene | 0 | 100 |
| 35 | Cl | Cl | — | cyclohexylene | 0 | 100 |
| 36 | H | Cl | 2 | cyclohexylene | 50 | 50 |
| 37 | H | $CH_3$ | 2 | cyclohexylene | 50 | 50 |
| Control | | cellulose aceta.e butyrate | | | | |

*This was coated out of tetrahydrofuran rather than acetone.

The formulation was handcoated in each instance at a 100 micron wet thickness on a subbed poly(ethylene terephthalate) support, and thereafter dried by placing the coating for one minute on a coating block set at about 32° C., and then at about 60° C. for about 5 minutes.

The sensitometry of the test samples was determined from prints prepared by contact exposing the film for four seconds through a 0.15 log E silver step tablet original in an IBM Micromaster Diazo Copier IID exposing apparatus and then developing the image by contacting the back of the film for five seconds to a hot block set at 140° C.

Table V states the number of developed 0.15 log E steps and the maximum neutral densities of the print. All of the prints had minimum neutral densities of less than 0.05. Although $D_{max}$ was not actually determined as a maximum shoulder density as herein defined, the maximum neutral densities reported were sufficiently close to such maximum shoulder densities as to be representative of the same.

TABLE V

| Example | Maximum Neutral Density | 0.15 log E Steps |
|---|---|---|
| 18 | 2.80 | 12 |
| 19 | 2.04 | 8 |
| 20 | 2.68 | 10 |
| 21 | 1.92 | 6 |
| 22 | 1.99 | 6 |
| 23 | 1.38 | 4 |
| 24 | 2.64 | 12 |
| 25 | 2.70 | 14 |
| 26 | 2.71 | 12 |
| 27 | 3.17 | 8 |
| 28 | 1.76 | 14 |
| 29 | 2.11 | 10 |
| 30 | 2.47 | 6 |
| 31 | 2.37 | 6 |
| 32 | 2.71 | 10 |
| 33 | 3.11 | 10 |
| 34 | 1.75 | 6 |
| 35 | 2.01 | 6 |
| 36 | 2.36 | 6 |
| 37 | 2.32 | 10 |
| Control | 0.42 | 8 |

Thus, each of these examples showed a maximum neutral density, which here is equivalent to $D_{max}$, that is significantly greater than 1.0 and is markedly improved over that of cellulose acetate butyrate. (Marked differences, if any, between these results and the results for the same binders tested in Examples 1-17 are due primarily to differences in binder-to-phthalaldehyde ratios.)

EXAMPLE 38

Example 18 was repeated, except that the binder was the copolymer poly(p-methylsulfonamidostyrene-co-methyl vinyl ketone) (50:50). The resulting maximum neutral density was 2.76 for four 0.15 log E steps.

EXAMPLE 39

Example 18 was repeated except that the binder was poly[2-(benzenesulfonamido)ethyl methacrylate]. The resulting maximum neutral density produced was 1.75 for four 0.15 log E steps.

The invention has been described in detail with particular reference to certain preferred embodiments thereof, but it will be understood that variations and modifications can be effected within the spirit and scope of the invention.

What is claimed is:

1. In a dye imaging composition comprising, in admixture, a material capable of generating amines in response to activating radiation, said material comprising a reducible cobalt(III) complex containing releasable amine ligands a binder, and an aromatic dialdehyde capable of reacting with said amines to form a dye;

the improvement wherein said binder is a polymer having recurring units with a structure selected from the group consisting of (I) 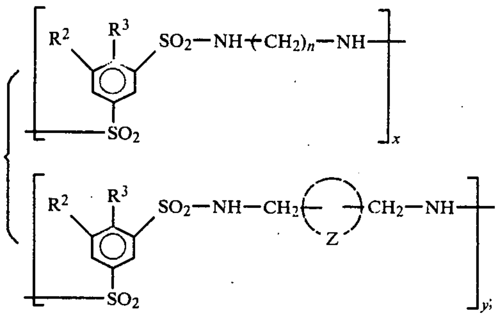

(II) 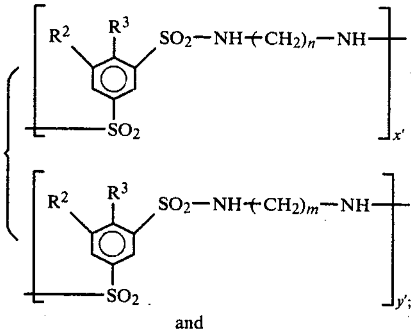

and (III) 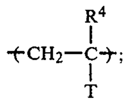

wherein $R^2$ and $R^3$ are the same or different, and are each hydrogen, halogen or alkyl from 1 to 4 carbon atoms;

T is either cyano or

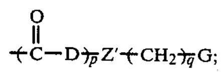

D is —O— or —NH—;

Z' is a covalent bond between carbon and D, or is the moiety

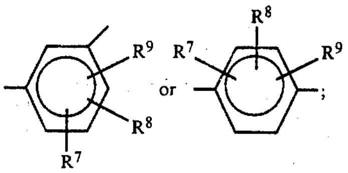

G is either $-NR^1-SO_2R^5$ or $-SO_2-NR^1R^6$;
$R^1$ is hydrogen or methyl;
$R^4$ is hydrogen or alkyl containing from 1 to 4 carbon atoms;
$R^5$ and $R^6$ are each alkyl containing from 1 to 4 carbon atoms, aralkyl, or aryl or substituted aryl containing from 6 to 10 carbon ring atoms;
$R^7$, $R^8$ and $R^9$ are the same or different and are each hydrogen, alkyl containing from 1 to 3, carbon atoms, or G;
n and m are different and are each an integer of from 2 through 12,
p is 0 or 1;
q is 0, 1, 2 or 3 except that it is 0 or 1 if Z' is phenylene;
x, x', y and y' are mole percentage amounts of the respective recurring units, x ranging from 0 to about 90%, y being at least about 10%, and x' and y' being from 0 to 100%; and
Z represents the atoms necessary to form a saturated or unsaturated carbocyclic ring having from 5 to 7 carbon ring atoms.

2. A composition as defined in claim 1, wherein said binder is a polysulfonamide.

3. A composition as defined in claim 1, wherein said binder has recurring units with the structure

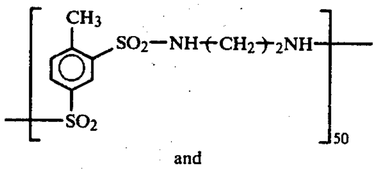

and

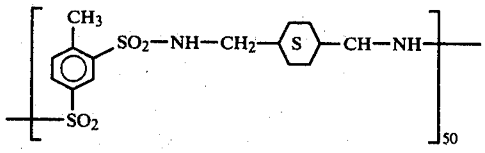

4. A composition as defined in claim 1, wherein said binder is poly(methacrylonitrile).

5. A composition as defined in claim 1, and further including a photoactivator capable of reducing said complex upon exposure to activating radiation having wavelengths greater than about 300 nm.

6. A composition as defined in claim 1, wherein said dialdehyde is o-phthalaldehyde.

7. In a dye imaging composition comprising, in admixture a binder, phthalaldehyde, and a material capable of generating ammonia in response to activating radiation, said material comprising a reducible cobalt(III) complex containing releasable amine ligands;
the improvement wherein said binder has recurring units with the structure

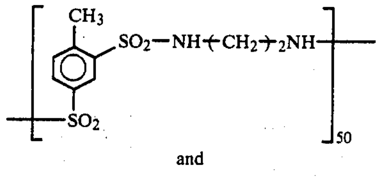

and

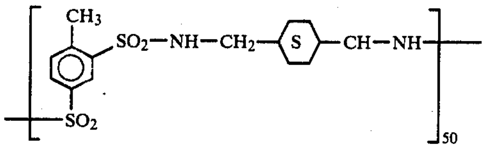

8. In a dye imaging element comprising a support bearing a composition comprising a binder and, in admixture with said binder, and aromatic dialdehyde capable of reacting with an amine to form a dye, and, associated with said composition, a material capable of generating amines in response to activating radiation and comprising a reducible cobalt(III) complex containing releasable amine ligands;
the improvement wherein said binder is a polymer having recurring units with a structure selected from the group consisting of (I) 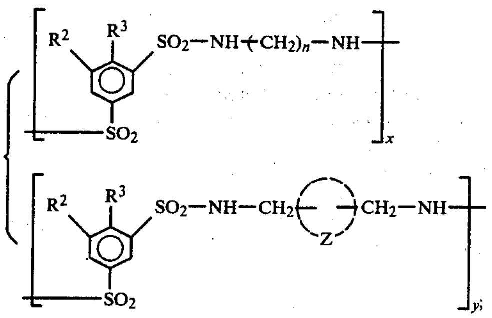

(II) 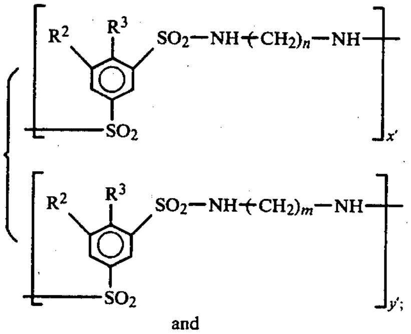

and (III) $-(CH_2-C(R^4)(T))-$;

wherein
$R^2$ and $R^3$ are the same or different, and are each hydrogen, halogen or alkyl from 1 to 4 carbon atoms;
T is either cyano or $-(C(=O)-D)_p Z'-(CH_2)_q G$;

D is —O— or —NH—;

Z' is a covalent bond between carbon and D, or is the moiety

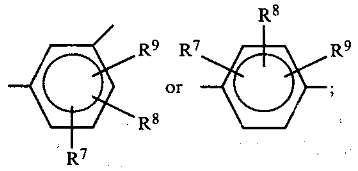

G is either $-NR^1-SO_2R^5$ or $-SO_2-NR^1R^6$;

$R^1$ is hydrogen or methyl;

$R^4$ is hydrogen or alkyl containing from 1 to 4 carbon atoms;

$R^5$ and $R^6$ are each alkyl containing from 1 to 4 carbon atoms, aralkyl, or aryl or substituted aryl containing from 6 to 10 carbon ring atoms;

$R^7$, $R^8$ and $R^9$ are the same or different and are each hydrogen, alkyl containing from 1 to 3 carbon atoms, or G;

n and m are different and are each an integer of from 2 through 12, p is 0 or 1;

q is 0, 1, 2 or 3 except that it is 0 or 1 if Z' is phenylene;

x, x', y and y' are mole percentage amounts of the respective recurring units, x ranging from 0 to about 90%, y being at least about 10%, and x' and y' being from 0 to 100%; and Z represents the atoms necessary to form a saturated or unsaturated carbocyclic ring having from 5 to 7 carbon ring atoms.

9. An element as defined in claim 8, wherein said binder is a polysulfonamide.

10. An element as defined in claim 8 wherein said binder contains recurring units with the structure

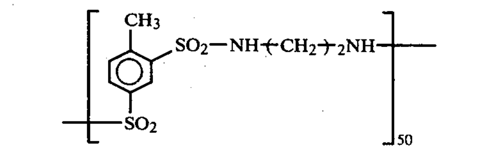

and

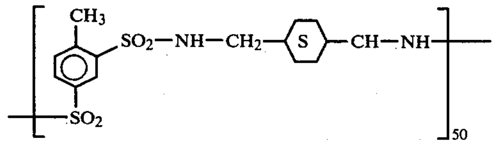

11. An element as defined in claim 8, wherein said binder is poly(methacrylonitrile).

12. An element as defined in claim 8, and further including a photoactivator capable of reducing said complex upon exposure to activating radiation having wavelengths greater than about 300 nm.

13. An element as defined in claim 8, wherein said dialdehyde is o-phthalaldehyde.

14. In a dye imaging element comprising a support bearing a composition comprising a binder, phthalaldehyde, admixed with said binder, and associated with said composition, a material capable of generating ammonia in response to activating radiation and comprising a reducible cobalt(III) complex containing releasable amine ligands;

the improvement wherein said binder contains recurring units with the structure

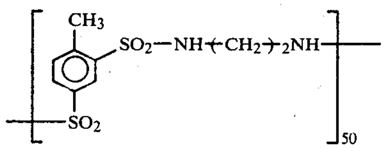

and

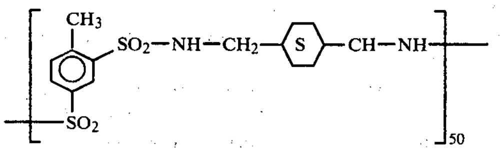

15. In a dye imaging element comprising a support bearing a composition comprising a binder, phthalaldehyde, admixed with said binder and associated with said composition, a material capable of generating ammonia in response to activating radiation and comprising a reducible cobalt(III) complex containing releasable amine ligands;

the improvement wherein said binder contains recurring units with the structure

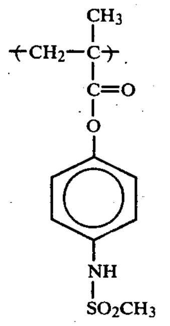

16. A method for the formation of a dye image, comprising the steps of (a) exposing to activating radiation a composition comprising a material capable of generating amines in response to activating radiation, said material comprising a reducible cobalt(III) complex containing releasable amine ligands; and (b) thereafter developing an image in response to the generated amines while said composition is in association with a composition comprising (i) an admixture of an aromatic dialdehyde capable of reacting with said generated amines to form a dye, and (ii) a polymeric binder having recurring units with a structure selected from the group consisting of (I)
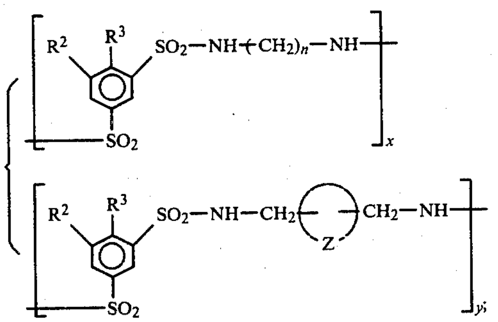

(II)
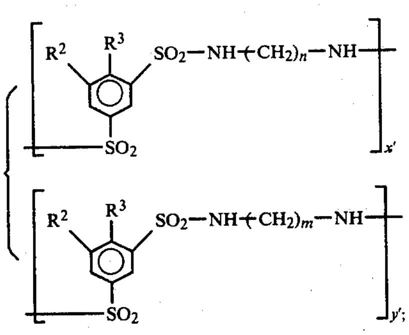

and (III)
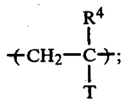

wherein $R^2$ and $R^3$ are the same or different, and are each hydrogen, halogen or alkyl from 1 to 4 carbon atoms;

T is either cyano or

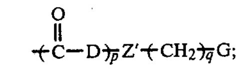

D is —O— or —NH—;

Z' is a covalent bond between carbon and D, or is the moiety

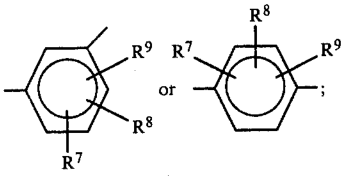

G is either $-NR^1-SO_2R^5$ or $-SO_2-NR^1R^6$;

$R^1$ is hydrogen or methyl;

$R^4$ is hydrogen or alkyl containing from 1 to 4 carbon atoms;

$R^5$ and $R^6$ are each alkyl containing from 1 to 4 carbon atoms, aralkyl, or aryl or substituted aryl containing from 6 to 10 carbon ring atoms;

$R^7$, $R^8$ and $R^9$ are the same or different and are each hydrogen, alkyl containing from 1 to 3 carbon atoms, or G;

n and m are different and are each an integer of from 2 through 12, p is 0 or 1;

q is 0, 1, 2 or 3 except that it is 0 or 1 if Z' is phenylene;

x, x', y and y' are mole percentage amounts of the respective recurring units, x ranging from 0 to about 90%, y being at least about 10%, and x' and y' being from 0 to 100%; and Z represents the atoms necessary to form a saturated or unsaturated carbocyclic ring having from 5 to 7 carbon ring atoms.

* * * * *

UNITED STATES PATENT AND TRADEMARK OFFICE

CERTIFICATE OF CORRECTION

PATENT NO. 4,247,625

DATED January 27, 1981

INVENTOR(S) George L. Fletcher, Wojciech M. Przezdziecki, John C. Wilson, Paul D. Yacobucci and Richard C. Van Hanehem It is certified that error appears in the above-identified patent and that said Letters Patent are hereby corrected as shown below Col. 3, lines 25-30 formula (II) reading " (II) 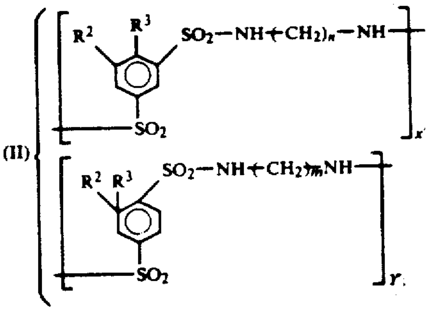 "

should read -- (II) 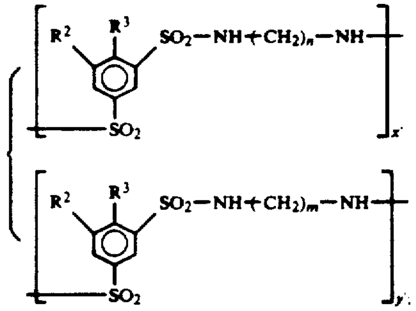 --.

Col. 12, lines 67-68, delete "Position on Phenyl".

Col. 13, Table II, the heading reading "Group", should read --Position on Phenyl Group--.

UNITED STATES PATENT AND TRADEMARK OFFICE

CERTIFICATE OF CORRECTION

PATENT NO. : 4,247,625

DATED : January 27, 1981

INVENTOR(S) : George L. Fletcher et al

It is certified that error appears in the above-identified patent and that said Letters Patent are hereby corrected as shown below:

Col. 18, line 18, "and", should read --an--.

Signed and Sealed this

*First* Day of *September 1981*

[SEAL]

*Attest:*

GERALD J. MOSSINGHOFF

*Attesting Officer* *Commissioner of Patents and Trademarks*